US011281222B2

(12) United States Patent
Chen et al.

(10) Patent No.: US 11,281,222 B2
(45) Date of Patent: Mar. 22, 2022

(54) UNMANNED AERIAL VEHICLE CONTROL METHOD (71) Applicant: GUANGZHOU XAIRCRAFT TECHNOLOGY CO., LTD, Guangzhou (GD)

(72) Inventors: Yousheng Chen, Guangzhou (CN); Bin Wu, Guangzhou (CN)

(73) Assignee: GUANGZHOU XAIRCRAFT TECHNOLOGY CO., LTD, Guangzhou (CN)

( * ) Notice: Subject to any disclaimer, the term of this patent is extended or adjusted under 35 U.S.C. 154(b) by 64 days.

(21) Appl. No.: 16/305,582

(22) PCT Filed: Feb. 20, 2017

(86) PCT No.: PCT/CN2017/074161
§ 371 (c)(1),
(2) Date: Nov. 29, 2018

(87) PCT Pub. No.: WO2018/098906
PCT Pub. Date: Jun. 7, 2018

(65) Prior Publication Data
US 2020/0326710 A1    Oct. 15, 2020

(30) Foreign Application Priority Data
Nov. 29, 2016 (CN) .......................... 201611079824.8

(51) Int. Cl.
*G05D 1/02* (2020.01)
*G05D 1/10* (2006.01)
*B64C 39/02* (2006.01)

(52) U.S. Cl.
CPC ......... *G05D 1/0204* (2013.01); *B64C 39/024* (2013.01); *G05D 1/106* (2019.05); *B64C 2201/12* (2013.01); *B64C 2201/141* (2013.01)

(58) Field of Classification Search
CPC .... G05D 1/0204; G05D 1/106; B64C 39/024; B64C 2201/12; B64C 2201/141; B64C 13/22
See application file for complete search history.

(56) References Cited

U.S. PATENT DOCUMENTS

2011/0221692 A1* 9/2011 Seydoux ............. G06F 3/04883
345/173
2011/0264314 A1* 10/2011 Parras ................. G05D 1/0676
701/16
(Continued)

FOREIGN PATENT DOCUMENTS

CN    105159321 A    12/2015
CN    105182986 A    12/2015
(Continued)

OTHER PUBLICATIONS

Gopalakrishnan, E. "Quadcopter Flight Mechanics Model and Control Algorithms", M.S. thesis, Czech Technical University, Space Masters Program May 2016., Figure 3. (Year: 2016).*
(Continued)

Primary Examiner — Peter D Nolan
Assistant Examiner — Tanya C Sienko
(74) Attorney, Agent, or Firm — Cantor Colburn LLP (57) ABSTRACT An unmanned aerial vehicle control method and apparatus are provided. The method includes: obtaining, in real time, the motion status information of an unmanned aerial vehicle moving under the effect of a user-applied external force (100); generating at least one unmanned aerial vehicle control instruction based on the motion status information (110) and controlling the unmanned aerial vehicle to perform a corresponding flight action according to the at least one unmanned aerial vehicle control instruction (120). After an unmanned aerial vehicle moves under the effect of a user-applied external force, the control method further con-
(Continued)

trols the unmanned aerial vehicle to perform a corresponding flight action according to the current motion tendency of the unmanned aerial vehicle, thus freeing the user from mastering a complicated unmanned aerial vehicle control technology, reducing the difficulty of the control over the unmanned aerial vehicle and making the unmanned aerial vehicle more applicable.

8 Claims, 3 Drawing Sheets

(56) References Cited

U.S. PATENT DOCUMENTS

| | | | |
|---|---|---|---|
| 2015/0286216 A1* | 10/2015 | Miwa | G05D 1/0088 701/4 |
| 2016/0062364 A1* | 3/2016 | Foinet | G05D 1/0011 701/2 |
| 2016/0101856 A1* | 4/2016 | Kohstall | B64C 39/028 244/17.13 |
| 2016/0179096 A1* | 6/2016 | Bradlow | G05D 1/0669 701/8 |
| 2016/0313742 A1* | 10/2016 | Wang | B64C 39/024 |
| 2020/0241575 A1* | 7/2020 | Meisenholder | G05D 1/0016 |

FOREIGN PATENT DOCUMENTS

| | | |
|---|---|---|
| CN | 105446356 A | 3/2016 |
| CN | 10559874 A | 5/2016 |
| CN | 105739533 A | 7/2016 |
| CN | 105843241 A | 8/2016 |
| JP | 2016043927 A | 4/2016 |
| WO | 2013123944 A1 | 8/2013 |
| WO | 2014068982 A1 | 5/2014 |
| WO | 2015179797 A1 | 11/2015 |

OTHER PUBLICATIONS

Gomes A. et al., "BitDrones: Towards Using 3D Nanocopter Displays as Interactive Self-Levitating Programmable Matter", CHI 2016, San Jose, CA, USA, pp. 770-780, accessible at https://dl.acm.org/doi/10.1145/2858036.2858519 (Year: 2016).*
International Search Report for corresponding application PCT/CN2017/074161 filed Feb. 20, 2017; dated Sep. 5, 2017.
European Search Report for corresponding application EP17 87 6558; Report dated Sep. 19, 2019.
European Office Action for corresponding application EP17 87 6558; Report dated Jul. 27, 2020.
Australian Office Action for corresponding application 2017369919 dated Jun. 6, 2019.

* cited by examiner

UNMANNED AERIAL VEHICLE CONTROL METHOD

TECHNICAL FIELD

The present disclosure relates to the field of unmanned aerial vehicle technologies, and in particular to an unmanned aerial vehicle control method.

BACKGROUND

With the continuous development of unmanned aerial vehicle technologies, unmanned aerial vehicles have been widely used in plant protection, aerial survey and aerial photography. Generally, an unmanned aerial vehicle is controlled in the following way: a remote control acquires a control operation of the user on the unmanned aerial vehicle, generates a corresponding unmanned aerial vehicle control instruction and then sends the unmanned aerial vehicle control instruction to the unmanned aerial vehicle in a wireless signal transmission manner so as to control the unmanned aerial vehicle to perform a corresponding action. Existing unmanned aerial vehicle control methods requires an unmanned aerial vehicle controller to be good at operating an unmanned aerial vehicle and is therefore not suitable for ordinary users.

SUMMARY

The embodiment of the present disclosure provides an unmanned aerial vehicle control method to address the problem that existing unmanned aerial vehicle control methods which at least request the user of an unmanned aerial vehicle to master a high-standard control technology are not applicable to ordinary users.

In a first aspect, the embodiment of the present disclosure provides an unmanned aerial vehicle control method, including: obtaining (or acquiring), in real time, the motion status information of an unmanned aerial vehicle moving under the effect of a user-applied external force; generating at least one unmanned aerial vehicle control instruction based on the motion status information; and controlling the unmanned aerial vehicle to perform a corresponding flight action according to the at least one unmanned aerial vehicle control instruction.

In a second aspect, the embodiment of the present disclosure provides an unmanned aerial vehicle control apparatus, including: a motion status information acquisition module configured to obtain (or acquire), in real time, the motion status information of an unmanned aerial vehicle moving under the effect of a user-applied external force; a control instruction generation module configured to generate at least one unmanned aerial vehicle control instruction based on the motion status information acquired by the motion status information acquisition module; and a flight control module configured to control the unmanned aerial vehicle to perform a corresponding flight action according to the at least one unmanned aerial vehicle control instruction generated by the control instruction generation module.

By acquiring, in real time, the motion status information of an unmanned aerial vehicle moving under the effect of a user-applied external force; generating at least one unmanned aerial vehicle control instruction based on the motion status information and controlling the unmanned aerial vehicle to perform a corresponding flight action according to the at least one unmanned aerial vehicle control instruction, the unmanned aerial vehicle control method disclosed herein addresses the problem that existing unmanned aerial vehicle control methods which at least request the user of an unmanned aerial vehicle to master a high-standard control technology are not applicable to ordinary users. After an unmanned aerial vehicle starts moving under the effect of a user-applied external force, the control method disclosed herein further controls the unmanned aerial vehicle to perform a corresponding flight action according to the current motion tendency of the unmanned aerial vehicle, thus freeing the user from mastering a complicated unmanned aerial vehicle control technology, reducing the difficulty of the control over the unmanned aerial vehicle and making the unmanned aerial vehicle more applicable.

BRIEF DESCRIPTION OF THE DRAWINGS

To make the technical solutions of the present invention understood better, the accompanying drawings needed for the description of embodiments of the present disclosure are introduced below briefly. Apparently, the accompanying drawings are merely illustrative of certain embodiments of the present disclosure, and other drawings can be devised by those of ordinary skill in the art based on the accompanying drawings without making creative efforts.

DETAILED DESCRIPTION OF THE EMBODIMENTS

The technical solutions provided herein will be described below clearly and completely with reference to accompanying drawings, and apparently, the embodiments described herein are a part of but not all of the embodiments of the present disclosure. Any embodiment that is devised by those of ordinary skill in the art based on those mentioned herein without making creative efforts should fall within the scope of protection of the present disclosure.

Embodiment 1

Figure 1:
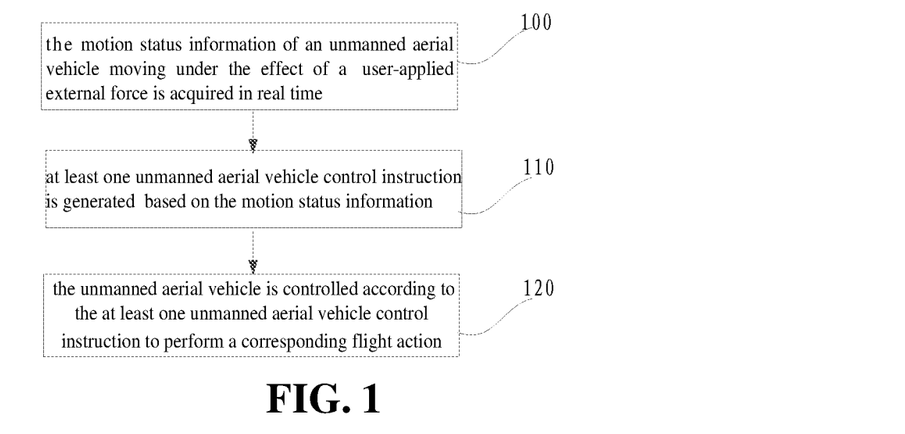
FIG. 1 is a flowchart illustrating an unmanned aerial vehicle control method according to embodiment 1 of the present disclosure.

An unmanned aerial vehicle control method is disclosed in the embodiment which, as shown in FIG. 1, includes the following steps 100-120.

Step 100: the motion status information of an unmanned aerial vehicle moving under the effect of a user-applied external force is acquired in real time.

The motion status information of an unmanned aerial vehicle includes at least one of: the linear acceleration, the angular velocity and the angular acceleration of the unmanned aerial vehicle. The user-applied external force refers to a force applied by the user to the unmanned aerial vehicle when the user touches the unmanned aerial vehicle, for example, a pulling/pushing force applied by the user to the unmanned aerial vehicle, a rotary force applied by the user to the unmanned aerial vehicle, or a force the user applies to grab the unmanned aerial vehicle. In implementations, the direction of the linear acceleration of the unmanned aerial vehicle is the direction of the user-applied external force and therefore can be any spatial direction, that is, the linear acceleration includes, but is not limited to be: a horizontal linear acceleration and a vertical linear acceleration. The acquired motion status information of an unmanned aerial vehicle reflects the magnitude and the direction of the external force applied by the controller to the unmanned aerial vehicle. For example, when the user rotates the unmanned aerial vehicle, the external force applied to the unmanned aerial vehicle causes the unmanned aerial vehicle from a hovering state to rotate, and an angular velocity sensor (e.g. gyroscope) arranged on the unmanned aerial vehicle acquires the real-time angular velocity and/or the real-time angular acceleration of the rotating unmanned aerial vehicle; when the user pushes/pulls the unmanned aerial vehicle towards a certain direction, the unmanned aerial vehicle moves linearly along the direction of the pushing/pulling force, and an acceleration sensor arranged on the unmanned aerial vehicle acquires the horizontal linear acceleration and the vertical linear acceleration of the unmanned aerial vehicle; when the user rotationally pushes the unmanned aerial vehicle towards a certain direction, the external force applied to the unmanned aerial vehicle causes the unmanned aerial vehicle in a hovering state to rotate, at the same time, the unmanned aerial vehicle moves linearly along the pushing force applied by the user to the unmanned aerial vehicle, in this case, an acceleration sensor arranged on the unmanned aerial vehicle acquires the horizontal linear acceleration and the vertical linear acceleration of the unmanned aerial vehicle, and an angular velocity sensor (e.g. gyroscope) arranged on the unmanned aerial vehicle acquires the real-time angular velocity and/or the real-time angular acceleration of the rotating unmanned aerial vehicle. Moreover, the magnitude of the external force applied by the user to the unmanned aerial vehicle directly affects the initial speed of the unmanned aerial vehicle. Thus, when the external force applied by the user to the unmanned aerial vehicle changes in direction or magnitude, the motion status of the unmanned aerial vehicle changes, and so does the motion status information of the unmanned aerial vehicle acquired. In implementations, after the unmanned aerial vehicle starts moving under the user-applied external force, the motion status information of the unmanned aerial vehicle acquired may be included: the angular velocity and the angular acceleration of the unmanned aerial vehicle; the horizontal linear acceleration of the unmanned aerial vehicle; the vertical linear acceleration of the unmanned aerial vehicle; the angular velocity, the angular acceleration and the horizontal linear acceleration of the unmanned aerial vehicle; the angular velocity, the angular acceleration and the vertical linear acceleration of the unmanned aerial vehicle; the horizontal linear acceleration and the vertical linear acceleration of the unmanned aerial vehicle; or the angular velocity, the angular acceleration, the horizontal linear acceleration and the vertical linear acceleration of the unmanned aerial vehicle.

After the unmanned aerial vehicle starts moving under the user-applied external force, the motion status information of the unmanned aerial vehicle further includes the linear velocity of the unmanned aerial vehicle. The direction of the linear velocity of the unmanned aerial vehicle is the direction of the user-applied external force and therefore can be any spatial direction, that is, the linear velocity includes, but is not limited to be: a horizontal linear velocity and a vertical linear velocity of the unmanned aerial vehicle.

Obtaining (or Acquiring), in real time, the motion status information of the unmanned aerial vehicle moving under the effect of a user-applied external force includes: according to a preset period to acquire the motion status information of the unmanned aerial vehicle moving under the effect of the user-applied external force. Generally, the preset period is very short, for example, 30 ms or less than 30 ms, thus, the acquisition of the motion status information of the unmanned aerial vehicle acquired every the preset period can be deemed as the real-time acquisition of the motion status information of the unmanned aerial vehicle.

Step 110: at least one unmanned aerial vehicle control instruction is generated based on the motion status information.

Different unmanned aerial vehicle control instructions are generated based on different motion status information. The unmanned aerial vehicle control instruction generated in the embodiment of the present disclosure includes all the unmanned aerial vehicle control instructions generated by existing controls for remote unmanned aerial vehicle, for example, the instruction for controlling the flight of the unmanned aerial vehicle to a position, the instruction for controlling the flight of the unmanned aerial vehicle at a linear velocity, the instruction for controlling the flight of the unmanned aerial vehicle to a height, the instruction for controlling the hovering of the unmanned aerial vehicle at a height, the instruction for controlling the rotation of the unmanned aerial vehicle at a angular velocity and an instruction for controlling the orientation of the head of the unmanned aerial vehicle towards a direction. The position refers to any spatial position that can be represented by coordinates used in the international coordinate system or by relative coordinates which take the unmanned aerial vehicle as the origin of coordinates. In implementations, an unmanned aerial vehicle control instruction can be generated according to the change tendency of one or more of the linear acceleration, the linear velocity, the angular acceleration and the angular velocity of the unmanned aerial vehicle that are acquired in real time. For example, an instruction for controlling the unmanned aerial vehicle to flight back to the initial position of the unmanned aerial vehicle is generated according to the change tendency of the horizontal linear acceleration of the unmanned aerial vehicle, and an instruction for controlling the orientation of the head of the unmanned aerial vehicle or the rotation of the unmanned aerial vehicle is generated according to the change tendency of the angular velocity or angular acceleration of the unmanned aerial vehicle.

Step 120: the unmanned aerial vehicle is controlled according to the at least one unmanned aerial vehicle control instruction to perform the corresponding flight action.

Because the tendency of the motion of the unmanned aerial vehicle changes when the direction and the magnitude of the external force applied by the user to the unmanned aerial vehicle change, at least one unmanned aerial vehicle control instruction can be generated based on the motion status information of the unmanned aerial vehicle. The unmanned aerial vehicle can be controlled according to the unmanned aerial vehicle control instruction generated in the foregoing steps to perform a corresponding flight action such as hovering, rotation, fly-up, fly-down, horizontal flight and horizontal rotation. How to control the unmanned aerial vehicle to perform the corresponding flight action according to the at least one unmanned aerial vehicle control instruction can be realized used existing technologies which are not described here repeatedly.

By obtaining (or acquiring), in real time, the motion status information of an unmanned aerial vehicle moving under the effect of a user-applied external force; generating at least one unmanned aerial vehicle control instruction based on the motion status information and controlling the unmanned aerial vehicle to perform the corresponding flight action according to the at least one unmanned aerial vehicle control instruction, the unmanned aerial vehicle control method disclosed herein addresses the problem that existing unmanned aerial vehicle control methods which at least request the user of an unmanned aerial vehicle to master a high-standard control technology are not applicable to ordinary users. After an unmanned aerial vehicle moves under the effect of a user-applied external force, the control method disclosed herein further controls the unmanned aerial vehicle to perform a corresponding flight action according to the current motion tendency of the unmanned aerial vehicle, thus freeing the user from mastering a complicated unmanned aerial vehicle control technology, reducing the difficulty of the control over the unmanned aerial vehicle and making the unmanned aerial vehicle more applicable.

Embodiment 2

Figure 2:
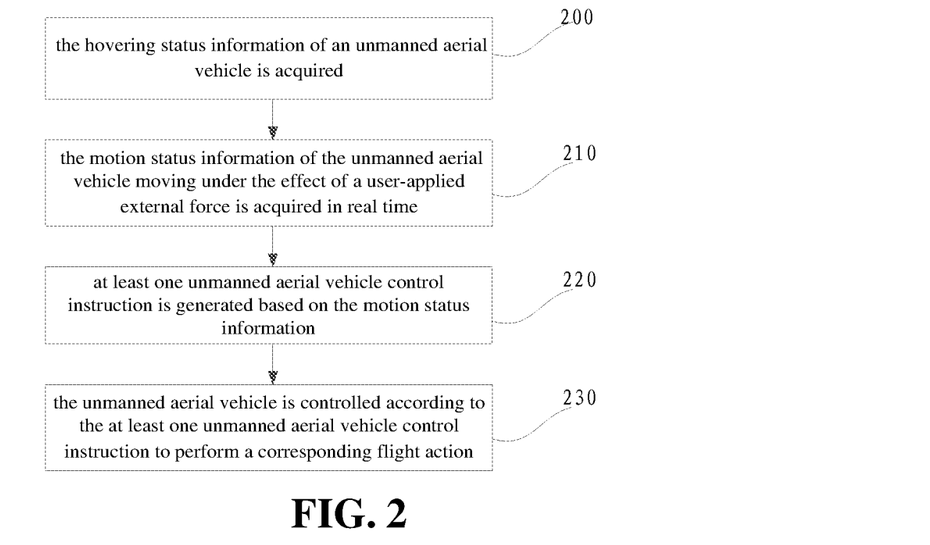
FIG. 2 is a flowchart illustrating an unmanned aerial vehicle control method according to embodiment 2 of the present disclosure.

An unmanned aerial vehicle control method is provided in the embodiment which, as shown in FIG. 2, includes the following steps 200-230.

Step 200: the hovering status information of an unmanned aerial vehicle is acquired.

The hovering status information includes: the initial position of the unmanned aerial vehicle and the initial direction of the head of the unmanned aerial vehicle, wherein the initial position of the unmanned aerial vehicle includes the initial horizontal position and the initial height of the unmanned aerial vehicle. The unique initial position of unmanned aerial vehicle can be determined by the initial horizontal position and the initial height of the unmanned aerial vehicle, and the initial direction of the head of the unmanned aerial vehicle is the direction of the head of the unmanned aerial vehicle in a hovering state.

When not subjected to a manually-applied external force, the unmanned aerial vehicle stays in a hovering state, that is, the unmanned aerial vehicle hovers at a height with the direction of its head unchanged so as to stay at the initial horizontal position. In implementations, the current position, for example, the horizontal position and the height, of the unmanned aerial vehicle is acquired by a GPS module, a camera, a laser sensor or the like that is installed on the unmanned aerial vehicle, and the linear velocity of the unmanned aerial vehicle in motion is measured. The angular velocity and the angular acceleration of the unmanned aerial vehicle are measured by a gyroscope, a magnetometer or an accelerometer that are arranged on the unmanned aerial vehicle. In implementations, the initial position of the unmanned aerial vehicle can be represented with coordinates of a GPS.

The hovering state information of the unmanned aerial vehicle can be acquired used existing related methods which are not described here repeatedly.

Step 210: the motion status information of the unmanned aerial vehicle moving under the effect of a user-applied external force is acquired in real time.

The motion status information of the unmanned aerial vehicle includes at least one of: the linear acceleration and the angular velocity of the unmanned aerial vehicle. In implementations, the direction of the linear acceleration of the unmanned aerial vehicle is the direction of the user-applied external force and therefore can be any spatial direction. The linear acceleration of the unmanned aerial vehicle can be directly represented to the magnitude and the direction of a linear acceleration or by the horizontal direction and the magnitude of a horizontal linear acceleration plus the vertical direction and the magnitude of a vertical linear acceleration or by the magnitude of a linear acceleration in the X-axis direction, the magnitude of a linear acceleration in the Y-axis direction and the magnitude of a linear acceleration in the Z-axis direction in a spatial coordinate system. No limitations are given here to the representation of a linear acceleration, In implementations, the linear acceleration mentioned herein may be represented with any linear acceleration representation form. In the embodiment, to make the unmanned aerial vehicle control method understood better, the unmanned aerial vehicle control method is described in detail based on an example of the representation of a linear acceleration with a horizontal linear acceleration and a linear acceleration. The motion status information of the unmanned aerial vehicle acquired reflects the magnitude and the direction of the external force applied by the user to the unmanned aerial vehicle, and In implementations, an unmanned aerial vehicle control instruction is generated according to the change tendency of the motion status information of the unmanned aerial vehicle acquired.

When the external force applied by the user to the unmanned aerial vehicle changes in direction or magnitude, the motion status of the unmanned aerial vehicle changes, so does the motion status information of the unmanned aerial vehicle acquired. In implementations, after the unmanned aerial vehicle starts moving under an external force applied by the controller, the motion state information of the unmanned aerial vehicle acquired may be included: the angular velocity of the unmanned aerial vehicle; the horizontal linear acceleration of the unmanned aerial vehicle; the vertical linear acceleration of the unmanned aerial vehicle; the angular velocity and the horizontal linear acceleration of the unmanned aerial vehicle; the angular velocity and the vertical linear acceleration of the unmanned aerial vehicle; the horizontal linear acceleration and the vertical linear acceleration of the unmanned aerial vehicle; and the angular velocity, the horizontal linear acceleration and the vertical linear acceleration of the unmanned aerial vehicle.

In implementations, the angular velocity of the unmanned aerial vehicle can be acquired by a gyroscope installed on the unmanned aerial vehicle, and the acceleration of the unmanned aerial vehicle can be acquired by an acceleration sensor installed on the unmanned aerial vehicle. The linear acceleration of the unmanned aerial vehicle includes the horizontal linear acceleration and the vertical linear acceleration of the unmanned aerial vehicle. The horizontal linear acceleration includes the accelerations in two dimensions of a horizontal plane, and In implementations, for the sake of convenience of control, a horizontal linear acceleration can be generated according to the accelerations in two dimensions of a horizontal plane. The generated horizontal acceleration has two attributes: acceleration magnitude and acceleration direction.

Step 220: at least one unmanned aerial vehicle control instruction is generated based on the motion status information.

Different unmanned aerial vehicle control instructions are generated based on different motion status information. The unmanned aerial vehicle control instruction generated in the embodiment includes all the unmanned aerial vehicle control instructions generated by existing remote controls for unmanned aerial vehicles. The generation of at least one unmanned aerial vehicle control instruction based on the motion status information is described below in detail. The motion status information acquired includes one or more of: the horizontal linear acceleration, the vertical linear acceleration and the angular velocity of the unmanned aerial vehicle. The embodiment of the present disclosure, the motion status information is described based on a linear motion and a rotation motion. The motion status information of the unmanned aerial vehicle performed a linear action includes: the linear acceleration and the linear velocity of the unmanned aerial vehicle. The motion status information of the unmanned aerial vehicle performed a rotation action includes: the angular velocity and the angular acceleration of the unmanned aerial vehicle. The motion status information of the unmanned aerial vehicle synchronously performing a linearly action and a rotation action includes the linear acceleration, the linear velocity, the angular velocity and the angular acceleration of the unmanned aerial vehicle. In implementations, the unmanned aerial vehicle can be controlled to perform corresponding flight actions by separately generating a linear motion control instruction and a rotation motion control instruction. To be understood better, the motion status information of the unmanned aerial vehicle is described by type.

Type 1: the motion status information of the unmanned aerial vehicle includes: the linear velocity and the linear acceleration of the unmanned aerial vehicle.

Generating at least one unmanned aerial vehicle control instruction based on the motion status information includes: determining, according to the change tendency of the linear acceleration of the unmanned aerial vehicle acquired in real time, whether or not the user-applied external force under which the unmanned aerial vehicle starts moving is an interferential external force, if so, generating a first instruction for controlling the unmanned aerial vehicle to fly back to the initial position thereof, otherwise, generating an unmanned aerial vehicle control instruction according to the linear velocity of the unmanned aerial vehicle acquired in real time.

By taking the motion status information being the horizontal linear acceleration of the unmanned aerial vehicle as an example, the step of determining, according to the change tendency of the linear acceleration of the unmanned aerial vehicle acquired in real time, whether or not the user-applied external force under which the unmanned aerial vehicle starts moving is an interferential external force includes: determining that the user-applied external force under which the unmanned aerial vehicle starts moving is an interferential external force if the interval between a first time point at which the horizontal linear acceleration of the unmanned aerial vehicle increases to a first acceleration threshold and a second time point at which the peak horizontal linear acceleration of the unmanned aerial vehicle is attenuated to the first acceleration threshold is smaller than a first time threshold, or determining that the user-applied external force under which the unmanned aerial vehicle starts moving is not an interferential external force if the interval between the first time point and the second time point is equal to or greater than the first time threshold.

The horizontal linear acceleration of the unmanned aerial vehicle is nearly zero when the unmanned aerial vehicle is in the hovering state. If the user horizontally pushes the unmanned aerial vehicle in a hovering state, then the unmanned aerial vehicle starts moving under the horizontal pushing force and obtains a relatively large acceleration in the horizontal direction, thus, the horizontal linear acceleration of the unmanned aerial vehicle increases rapidly from 0 and attenuates gradually after the external force is released. In implementations, the horizontal linear acceleration of the unmanned aerial vehicle is acquired in real time during the process the unmanned aerial vehicle moves under the effect of an external force. First, the time point at which the horizontal linear acceleration of the unmanned aerial vehicle increases to the first acceleration threshold is marked as T1; then, the horizontal linear acceleration of the unmanned aerial vehicle increases gradually, reaches the peak when the external force is released and starts to attenuating; the time point at which the horizontal linear acceleration of the unmanned aerial vehicle is attenuated to the first acceleration threshold is marked as T2; at last, an unmanned aerial vehicle control instruction is generated according to the change tendency of the horizontal linear acceleration of the unmanned aerial vehicle. For example, the current external force is considered as an interferential external force if the interval between T2 and T1 is smaller than a first time threshold or not considered as an interferential external force if the interval between T2 and T1 is equal to or greater than the first time threshold. A first instruction for controlling the unmanned aerial vehicle to fly back to the initial horizontal position thereof is generated if the user-applied external force is an interferential external force. If the user-applied external force is not an interferential external force, an unmanned aerial vehicle control instruction, for example, an instruction for controlling the unmanned aerial vehicle to stop flying along the horizontal direction or an instruction for controlling the unmanned aerial vehicle to fly at the current linear velocity, is generated according to the linear velocity acquired in real time. By setting the condition of the change tendency of the horizontal linear acceleration, the interference caused by an external force and the interference or the error caused by the measurement of acceleration can be eliminated effectively. In implementations, the linear velocity of the unmanned aerial vehicle in motion can be measured by a device, for example, a GPS module, a camera and a laser sensor, arranged on the unmanned aerial vehicle. The acquisition of the current linear velocity of the unmanned aerial vehicle can be realized used existing related methods which are not described here repeatedly.

By taking the motion status information being the vertical linear acceleration of the unmanned aerial vehicle as an example, determining, according to the change tendency of the linear acceleration of the unmanned aerial vehicle acquired in real time, whether or not the user-applied external force under which the unmanned aerial vehicle starts moving is an interferential external force includes: determining that the user-applied external force under which the unmanned aerial vehicle starts moving is an interferential external force if the interval between a third time point at which the vertical linear acceleration of the unmanned aerial vehicle increases to a second acceleration threshold and a fourth time point at which the peak vertical linear acceleration of the unmanned aerial vehicle is attenuated to the second acceleration threshold is smaller than a second time threshold, or determining that the external force applied by the user to the unmanned aerial vehicle is not an interferential external force if the interval between the third time point and the fourth time point is equal to or greater than the second time threshold. In the embodiment, the vertical linear acceleration of the unmanned aerial vehicle is a linear acceleration generated under the effect of the user-applied external force, not including the acceleration of gravity. In implementations, if the vertical linear velocity measured by the acceleration sensor of the unmanned aerial vehicle includes the acceleration of gravity, the vertical linear acceleration generated under the effect of an external force applied by the user can be calculated by adding or subtracting the acceleration of gravity to or from the vertical linear acceleration obtained by the acceleration sensor in the direction of the vertical linear acceleration.

Because the vertical linear acceleration of the unmanned aerial vehicle in a hovering state is 0, the flight control system of the unmanned aerial vehicle generates, for the unmanned aerial vehicle, a force equal in magnitude to but opposite in direction to the gravity to counteract the gravity. When the user vertically pushes/pulls the unmanned aerial vehicle in a hovering state, the unmanned aerial vehicle starts moving under the vertical pushing/pulling force and obtains, in the vertical direction, an acceleration different from the acceleration of gravity, thus, the vertical acceleration of the unmanned aerial vehicle increases gradually from 0 under the user-applied external force and attenuates gradually after the external force is released. In implementations, the vertical linear acceleration of the unmanned aerial vehicle is acquired in real time during the process the unmanned aerial vehicle moves under the effect of an external force. First, the time point at which the vertical linear acceleration of the unmanned aerial vehicle increases to the second acceleration threshold is marked as T3; then, the vertical linear acceleration of the unmanned aerial vehicle increases gradually, reaches the peak when the external force is released and then starts to attenuate; the time point at which the vertical linear acceleration of the unmanned aerial vehicle is attenuated to the second acceleration threshold is marked as T4; at last, an unmanned aerial vehicle control instruction is generated according to the change tendency of the vertical linear acceleration of the unmanned aerial vehicle. For example, the current user-applied external force is considered as an interferential external force if the interval between T3 and T4 is smaller than the second time threshold or not considered as an interferential external force if the interval between T3 and T4 is equal to or greater than the second time threshold. If the user-applied external force is not an interferential external force, an unmanned aerial vehicle control instruction, for example, an instruction for controlling the unmanned aerial vehicle to stop flying up or down or an instruction for controlling the unmanned aerial vehicle to fly at the current linear velocity, is generated according to the linear velocity acquired in real time. By setting the condition of the change tendency of the vertical linear acceleration, the interference of an external force and the interference or the error caused by the measurement of acceleration can be eliminated effectively. In implementations, the height of the unmanned aerial vehicle in motion can be measured by a device, for example, a GPS module, a camera and a laser sensor, arranged on the unmanned aerial vehicle. The acquisition of the current height of the unmanned aerial vehicle can be realized using existing related methods which are not described here repeatedly.

In implementations, the step of generating an unmanned aerial vehicle control instruction according to the linear velocity acquired in real time includes: generating a second instruction for controlling the unmanned aerial vehicle to fly at the linear velocity acquired in real time if the linear velocity acquired in real time is greater than a preset linear velocity threshold; or generating a third instruction for controlling the unmanned aerial vehicle to stop flying in the direction of the current linear velocity if the linear velocity acquired in real time is smaller than or equal to the preset linear velocity threshold. The motion status information of the unmanned aerial vehicle moving under the effect of a user-applied external force is acquired in real time when the unmanned aerial vehicle is in a hovering state or the unmanned aerial vehicle in a hovering state starts moving under the effect of the user-applied external force. If the acquired motion status information includes the linear velocity of the unmanned aerial vehicle, then in the embodiment based on an example of the inclusion of the horizontal linear velocity of the unmanned aerial vehicle in the linear velocity acquired in real time, an unmanned aerial vehicle control instruction is generated according to the linear velocity of the unmanned aerial vehicle acquired in real time after the user-applied external force is determined not to be an interferential external force. For example, if the horizontal linear velocity of the unmanned aerial vehicle corresponding to the second time point is greater than a preset linear velocity threshold, then an instruction for controlling the unmanned aerial vehicle to fly at the horizontal linear velocity of the unmanned aerial vehicle corresponding to the second time point is generated, otherwise, a third instruction for controlling the unmanned aerial vehicle to stop flying in the direction of the current linear velocity is generated to keep the unmanned aerial vehicle at the current horizontal position. In a case where the linear acceleration acquired in real time is represented with the magnitude and the direction of the linear acceleration of the unmanned aerial vehicle, whether or not the user-applied external force under which the unmanned aerial vehicle starts moving is an interferential external force can be determined directly according to the change tendency of the magnitude of the linear acceleration of the unmanned aerial vehicle; if the user-applied external force under which the unmanned aerial vehicle starts moving is an interferential external force, then an instruction for controlling the unmanned aerial vehicle to fly back to the initial position thereof in the direction of the linear acceleration is generated, otherwise, an unmanned aerial vehicle control instruction is generated according to the linear velocity acquired in real time. In the generation of an unmanned aerial vehicle control instruction according to the linear velocity acquired in real time, if the linear velocity acquired in real time is smaller than or equal to a preset linear velocity threshold, a third instruction for controlling the unmanned aerial vehicle to stop flying in the direction of the current linear velocity is generated, otherwise, an instruction for controlling the unmanned aerial vehicle to fly in the direction and the magnitude of the linear velocity acquired in real time is generated.

Type 2: the motion status information of the unmanned aerial vehicle includes: the angular velocity and the angular acceleration of the unmanned aerial vehicle.

If the motion status information of the unmanned aerial vehicle includes the angular velocity and the angular acceleration of the unmanned aerial vehicle, then the step of generating at least one unmanned aerial vehicle control instruction according to the motion status information of the unmanned aerial vehicle includes: determining whether or not the user-applied external force under which the unmanned aerial vehicle starts moving is an interferential external force according to the change tendency of the angular velocity or angular acceleration acquired in real time, if so, generating a fourth instruction for controlling the orientation of the head of the unmanned aerial vehicle towards the initial direction of the head of the unmanned aerial vehicle, otherwise, generating an unmanned aerial vehicle control instruction according to the angular velocity acquired in real time.

By taking the inclusion of the angular velocity of the unmanned aerial vehicle in the motion status information as an example, the step of determining whether or not the user-applied external force under which the unmanned aerial vehicle starts moving is an interferential external force according to the change tendency of the angular velocity acquired in real time includes: determining that the user-applied external force under which the unmanned aerial vehicle starts moving is an interferential external force if the interval between a fifth time point at which the angular velocity of the unmanned aerial vehicle increases to a first angular velocity threshold and a sixth time point at which the angular velocity reaches the peak is smaller than a third time threshold, or determining that the user-applied external force under which the unmanned aerial vehicle starts moving is not an interferential external force if the interval between the fifth time point and the sixth time point is equal to or greater than the third time threshold.

The angular velocity of the unmanned aerial vehicle in a hovering state is zero. When the user rotates the unmanned aerial vehicle, the unmanned aerial vehicle starts rotating under the user-applied external force and rotates at a gradually increased speed, the rotation speed of the unmanned aerial vehicle reaches the peak when the user-applied external force is released and then starts attenuating. The real-time angular velocity of the unmanned aerial vehicle can be obtained by an angular velocity sensor, for example, a gyroscope, arranged on the unmanned aerial vehicle during the rotation process of the unmanned aerial vehicle. The angular velocity of the unmanned aerial vehicle is acquired in real time during the process the unmanned aerial vehicle in a hovering state starts rotating. First, the time point at which the angular velocity of the unmanned aerial vehicle increases to a first angular velocity threshold is marked as T5; then, the angular velocity of the unmanned aerial vehicle increases gradually and reaches the peak when the user-applied external force is released and then starts attenuating; the time point at which the angular velocity of the unmanned aerial vehicle reaches the peak, that is, the time point at which the angular velocity of the unmanned aerial vehicle starts attenuating, is marked as T6; at last, an unmanned aerial vehicle control instruction is generated according to the change tendency of the angular velocity of the unmanned aerial vehicle. For example, the current user-applied external force is considered as an interferential external force if the interval between T6 and T5 is smaller than a third time threshold or not considered as an interferential external force if the interval between T6 and T5 is equal to or greater than the third time threshold. If the current user-applied external force is an interferential external force, then a fourth instruction for controlling the orientation of the head of the unmanned aerial vehicle towards the initial direction of the head of the unmanned aerial vehicle is generated, otherwise, a sixth instruction for controlling the unmanned aerial vehicle to rotate at the angular velocity acquired in real time is generated to control the unmanned aerial vehicle to rotate along the direction from which the user applies the external force.

The angular velocity of the unmanned aerial vehicle moving under the effect of the user-applied external force is acquired in real time when the unmanned aerial vehicle is in a hovering state and when the unmanned aerial vehicle in a hovering state starts moving under the effect of a user-applied external force. After the user-applied external force is determined not to be an interferential external force, the step of generating an unmanned aerial vehicle control instruction according to the angular velocity acquired in real time includes: generating a fifth instruction for controlling the orientation of the head of the unmanned aerial vehicle towards the current direction if the angular velocity acquired in real time is smaller than or equal to a preset angular velocity threshold; or generating a sixth instruction for controlling the unmanned aerial vehicle to rotate at the angular velocity acquired in real time if the angular velocity acquired in real time is greater than the preset angular velocity threshold. For example, an instruction for controlling the unmanned aerial vehicle to rotate at the angular velocity of the unmanned aerial vehicle corresponding to the sixth time point is generated after the rotational angular velocity of the unmanned aerial vehicle corresponding to the sixth time point is acquired in real time. By setting the condition of the change tendency of the angular velocity, the interference of an external force and the interference or the error caused by the measurement of an angular velocity can be eliminated effectively. In implementations, the acquisition of the angular velocity of the unmanned aerial vehicle can be realized using existing related methods which are not described here repeatedly.

In a case where the motion status information includes the angular acceleration of the unmanned aerial vehicle, determining whether or not the user-applied external force under which the unmanned aerial vehicle starts moving is an interferential external force according to the change tendency of the angular acceleration acquired in real time includes: determining that the user-applied external force under which the unmanned aerial vehicle starts moving is an interferential external force if the interval between a seventh time point at which the angular acceleration of the unmanned aerial vehicle increases to a first angular acceleration threshold and an eight time point at which the peak angular acceleration of the unmanned aerial vehicle is attenuated to the first angular acceleration threshold is smaller than a fourth time threshold, or determining that the user-applied external force under which the unmanned aerial vehicle starts moving is not an interferential external force if the interval between the seventh time point and the eight time point is equal to or greater than the fourth time threshold. The process of determining whether or not the user-applied external force under which the unmanned aerial vehicle starts moving is an interferential external force according to the change tendency of the angular acceleration of the unmanned aerial vehicle can be understood with reference to the process of determining whether or not the user-applied external force under which the unmanned aerial vehicle starts moving is an interferential external force according to the change tendency of the linear acceleration of the unmanned aerial vehicle and is therefore not described here repeatedly.

In implementations, the first and the second time threshold can be set according to a user-desired control sensitivity. In implementations, the first and the second acceleration threshold and the angular velocity threshold can also be set according to the user-desired control sensitivity. For example, the first time threshold may be set to be above 200 ms, and the first acceleration threshold may be set to be 0.2 g, wherein g represents the acceleration of gravity. The preset linear velocity threshold may be 0 or a value greater than 0, depending on the requirement of the user on control sensitivity.

Step 230: the unmanned aerial vehicle is controlled according to the at least one unmanned aerial vehicle control instruction to perform a corresponding flight action.

Because the tendency of the motion of the unmanned aerial vehicle changes when the external force applied by the user to the unmanned aerial vehicle changes in magnitude or direction, at least one unmanned aerial vehicle control instruction can be generated based on the motion status information of the unmanned aerial vehicle. In the embodiment, the unmanned aerial vehicle control instructions generated in the foregoing steps include, but are not limited to: a first instruction for controlling the unmanned aerial vehicle to fly back to the initial position thereof, an instruction for controlling the unmanned aerial vehicle to fly at a certain linear velocity, an instruction for controlling the unmanned aerial vehicle to stop flying at a certain linear velocity, an instruction for controlling the unmanned aerial vehicle to hover, an instruction for controlling the unmanned aerial vehicle to stay at the current position, an instruction for controlling the orientation of the head of the unmanned aerial vehicle towards the initial direction of the head of the unmanned aerial vehicle and an instruction for controlling the unmanned aerial vehicle to rotate at a certain angular velocity.

In implementations, each of the instructions is sent to a flight control module arranged on the unmanned aerial vehicle to control the unmanned aerial vehicle to perform a corresponding flight action under the effect of a user-applied external force. How to control the unmanned aerial vehicle to perform a corresponding flight action according to an unmanned aerial vehicle control instruction can be realized using existing technologies which are not described here repeatedly.

According to the flight control instruction generated in the Step 220, the unmanned aerial vehicle performs a flight action corresponding to the user-applied external force, for example, under a horizontal pushing/pulling force, the unmanned aerial vehicle flies horizontally along the direction of the external force; under a rotational external force, the unmanned aerial vehicle flies rotationally along the direction of the external force; under a vertical external force, the unmanned aerial vehicle flies up or down to a certain height along the direction of the external force; and under a horizontal pushing/pulling force and a rotational external force, the unmanned aerial vehicle flies horizontally and rotationally along the direction of the horizontal external force.

The flight status information of the unmanned aerial vehicle is acquired in real time when the unmanned aerial vehicle flies under the effect of a user-applied external force so as to acquire the real-time linear velocity, the real-time angular velocity, the linear acceleration, the current position and other flight status information of the unmanned aerial vehicle, and at least one unmanned aerial vehicle control instruction is generated based on the motion status information acquired in real time. In implementations, the flight status information of the unmanned aerial vehicle can be acquired using existing related methods which are not described here repeatedly.

By controlling the unmanned aerial vehicle to perform a corresponding flight action under the effect of a user-applied external force, more flight actions can be realized, for example, the unmanned aerial vehicle can be controlled to fly at a gradually attenuated linear velocity in response to a user-applied external force, or rotate at a gradually attenuated angular velocity, or rotationally fly at a gradually attenuated linear velocity and a gradually attenuated angular velocity. In implementations, during the process the unmanned aerial vehicle flies according to the second instruction for controlling the unmanned aerial vehicle to fly at the linear velocity acquired in real time, the method further includes: attenuating the linear velocity of the unmanned aerial vehicle acquired in real time by a first attenuation factor based on every preset period; and generating a second instruction for controlling the unmanned aerial vehicle to fly at the attenuated linear velocity. In implementations, the preset period may be set to be 30 ms, that is, the linear velocity of the unmanned aerial vehicle acquired in real time is attenuated every 30 ms. If the linear velocity of the unmanned aerial vehicle acquired in real time is greater than the first linear velocity threshold, then the linear velocity is attenuated by the first attenuation factor, and the second instruction for controlling the unmanned aerial vehicle to fly at the attenuated linear velocity is generated, otherwise, the third instruction for controlling the unmanned aerial vehicle to stop flying in the direction of the current linear velocity is generated.

In implementations, the rate at which the linear velocity of the unmanned aerial vehicle attenuation is a fixed value set by the user or set in advance, the larger the attenuation factor is, the faster the linear velocity attenuates. The smaller the attenuation factor is, the slower the linear velocity attenuates. The larger the external force applied by the user is, the further the unmanned aerial vehicle flies. The smaller the external force applied by the user is, the closer the unmanned aerial vehicle flies. The linear velocity V of the unmanned aerial vehicle is acquired in real time when the unmanned aerial vehicle flies under the effect of a user-applied external force, and the acquired linear velocity is attenuated by the preset first attenuation factor when the linear velocity V is greater than a first linear velocity threshold $V_{th}$. By taking the acquired real-time linear velocity V as an example, if the first attenuation factor is set to be $a_1$, then the attenuated linear velocity may be $(V-a_1*t)$, in which t represents the preset period. The unmanned aerial vehicle is controlled to fly at a velocity of $(V-a_1*t)$. The unmanned aerial vehicle is controlled to stay at the current position when the linear velocity V of the unmanned aerial vehicle is smaller than or equal to the first linear velocity threshold $V_{th}$. The first linear velocity threshold $V_{th}$ may be 10 cm/s. The linear velocity of the unmanned aerial vehicle being smaller than or equal to the first linear velocity threshold $V_{th}$ indicates that the unmanned aerial vehicle faces an obstacle or is caught by the user, or that the linear velocity cannot be attenuated any more.

During the process the unmanned aerial vehicle rotates according to the sixth instruction for controlling the unmanned aerial vehicle to rotate at the angular velocity acquired in real time, the method further includes: attenuating, by a second attenuation factor, the angular velocity of the unmanned aerial vehicle acquired in real time each preset period; and generating the sixth instruction for controlling the unmanned aerial vehicle to rotate at the attenuated angular velocity. In implementations, the preset period may be set to be 30 ms or less than 30 ms, that is, the angular velocity of the unmanned aerial vehicle acquired in real time is attenuated every 30 ms. If the angular velocity of the unmanned aerial vehicle acquired in real time is greater than a second angular velocity threshold, then the angular velocity is attenuated by the second attenuation factor, and an instruction for controlling the unmanned aerial vehicle to fly at the attenuated angular velocity is generated, otherwise, an instruction for controlling the orientation of the head of the unmanned aerial vehicle towards the initial direction is generated, or a fifth instruction for controlling the orientation of the head of the unmanned aerial vehicle towards the current direction is generated.

Similarly, the rate at which the angular velocity attenuation is a fixed value set by the user or set in advance, the higher the attenuation factor is, the faster the angular velocity attenuates. The angular velocity ω of the unmanned aerial vehicle is acquired in real time when the unmanned aerial vehicle rotationally flies under the effect of a user-applied external force, and the acquired angular velocity is attenuated according to a preset second attenuation factor $a_2$ when the angular velocity ω is greater than a second angular velocity threshold cote, the attenuated angular velocity can be (ω–$a_2$*t), and then, the unmanned aerial vehicle is controlled to fly rotationally at the speed of (ω–$a_2$*t). The unmanned aerial vehicle is controlled to stop rotating when the angular velocity ω is smaller than or equal to the second angular velocity threshold $ω_{th}$. The second angular velocity threshold $ω_{th}$, may be 3°/s. The angular velocity of the unmanned aerial vehicle being smaller than or equal to the second angular velocity threshold $ω_{th}$, indicates that the unmanned aerial vehicle faces an obstacle or is caught by the user, or that the angular velocity cannot attenuate any more.

In implementations, if the unmanned aerial vehicle flies linearly at a certain linear velocity and synchronously flies rotationally at a certain angular velocity, then the attenuation rate of the angular velocity of the unmanned aerial vehicle can be determined according to the initial linear velocity of the unmanned aerial vehicle and a linear velocity attenuation rate so that the linear velocity and the angular velocity of the unmanned aerial vehicle are attenuated to 0 at the same time. For example, the second attenuation factor is determined according to the linear velocity of the unmanned aerial vehicle corresponding to the second time point at which the horizontal linear acceleration of the unmanned aerial vehicle is attenuated to the first acceleration threshold, the first attenuation factor and the angular velocity of the unmanned aerial vehicle corresponding to the fourth time point at which the angular velocity of the unmanned aerial vehicle increases to the peak. If the initial linear velocity of the unmanned aerial vehicle is $V_0$ and the first attenuation factor is $a_0$, then the time t needed for the attenuation of the linear velocity of the unmanned aerial vehicle from an initial value $V_0$ to 0 can be calculated using the following formula: $t=V_0/a_0$; and if the initial rotational angular velocity of the unmanned aerial vehicle is coo and the second attenuation factor is $ω_0/t$, then the angular velocity of the unmanned aerial vehicle is attenuated to 0 when the linear velocity of the unmanned aerial vehicle is attenuated to 0.

The unmanned aerial vehicle can be controlled by more than one user to perform corresponding flight actions under user-applied external forces, for example, after being pushed to a second user from a first user, the unmanned aerial vehicle hovers when the linear velocity thereof attenuates to the first linear velocity threshold and then performs a corresponding flight action under the effect of an external force applied by the second user. In implementations, if the second user applies an external force to the flying unmanned aerial vehicle when the attenuated linear velocity of the unmanned aerial vehicle fails to reach the first linear velocity threshold, then the unmanned aerial vehicle performs a corresponding flight action under the effect of the external force applied by the second user. Alternatively, the velocity of the unmanned aerial vehicle drops to 0 when the unmanned aerial vehicle is caught by the second user during the process the unmanned aerial vehicle pushed from the first user to the second user is in motion, that is, when the velocity of the unmanned aerial vehicle fails to attenuate to the first linear velocity threshold. Then, an instruction for controlling the unmanned aerial vehicle to hover is generated to make the unmanned aerial vehicle hover at the current position; if the second user applies an external force vertical in direction to the direction of the motion of the unmanned aerial vehicle, then the unmanned aerial vehicle moves along the direction of the external force applied by the second user under the effect of the external force applied by the second user, in this case, an acceleration and a linear velocity which are identical in direction to the external force applied by the second user can be acquired, and then an instruction for controlling the unmanned aerial vehicle to fly at the current linear velocity is generated.

In another embodiment of the present disclosure, the unmanned aerial vehicle can be controlled to perform a flight action of simulating the movement of a boomerang. The unmanned aerial vehicle control method further includes a step of setting the flight mode of the unmanned aerial vehicle to be a boomerang mode before the step of acquiring, in real time, the motion status information of the unmanned aerial vehicle moving under the effect of a user-applied external force. The boomerang mode refers to a mode in which the unmanned aerial vehicle starts flying under the effect of a user-applied external force, flies along the direction of the user-applied external force at a gradually decreased speed and then flies back to the initial position of the unmanned aerial vehicle when the speed of the unmanned aerial vehicle is reduced to a preset threshold. The step of generating an unmanned aerial vehicle control instruction according to the linear velocity acquired in real time further includes: generating a first instruction for controlling the unmanned aerial vehicle to fly back to the initial position thereof if the linear velocity of the unmanned aerial vehicle acquired in real time is smaller than or equal to a preset linear velocity threshold and the flight mode of the unmanned aerial vehicle is the boomerang mode. In implementations, during the process the unmanned aerial vehicle flies according to a second instruction for controlling the unmanned aerial vehicle to fly at the linear velocity acquired in real time, the linear velocity of the unmanned aerial vehicle acquired in real time is attenuated according to a first attenuation factor each preset period. Then, a determination is made on the attenuated linear velocity of the unmanned aerial vehicle, if the attenuated linear velocity of the unmanned aerial vehicle is smaller than or equal to a preset linear velocity threshold and the flight mode of the unmanned aerial vehicle is the boomerang mode, then the first instruction for controlling the unmanned aerial vehicle to fly back to the initial position thereof is generated, wherein the initial position refers to the position where the unmanned aerial vehicle hovers last time; if the attenuated linear velocity is smaller than or equal to the preset linear velocity threshold but the flight mode of the unmanned aerial vehicle is not the boomerang mode, the third instruction for controlling the unmanned aerial vehicle to stop flying along the direction of the current linear velocity is generated; and if the attenuated linear velocity is greater than the preset linear velocity threshold, then the second instruction for controlling the unmanned aerial vehicle to fly at the attenuated linear velocity is generated. If the unmanned aerial vehicle flies at the current linear velocity and synchronously rotates at a certain angular velocity, then the angular velocity of the unmanned aerial vehicle, after being acquired, is attenuated by a third attenuation factor when the acquired angular velocity is greater than the second angular velocity threshold, and an instruction for controlling the unmanned aerial vehicle to fly at the attenuated angular velocity is generated, or an instruction for controlling the orientation of the head of the unmanned aerial vehicle towards the initial direction of the head of the unmanned aerial vehicle or the current direction is generated when the acquired angular velocity is not greater than the second angular velocity threshold.

For example, if the user applies a horizontal external force to the unmanned aerial vehicle in a hovering state and synchronously rotates the unmanned aerial vehicle, then the unmanned aerial vehicle moves fast in the direction of the horizontal external force and synchronously rotates at a certain angular velocity under the effect of the horizontal external force. The linear velocity V of the unmanned aerial vehicle is acquired in real time when the unmanned aerial vehicle flies under the effect of the user-applied external force, and the acquired linear velocity is attenuated by the preset first attenuation factor when the linear velocity V is greater than the first linear velocity threshold $V_{th}$. By taking the acquired real-time linear velocity V as an example, if the first attenuation factor is set to be $a_1$, then the attenuated linear velocity may be $(V-a_1*t)$. Then, the unmanned aerial vehicle is controlled to fly at the velocity of $(V-a_1*t)$. The unmanned aerial vehicle is controlled to fly back to the initial position thereof, that is, fly along the direction opposite to the direction of the user-applied external force, to get back to the position where the unmanned aerial vehicle hovers last time, when the linear velocity V of the unmanned aerial vehicle is smaller than or equal to the first linear velocity threshold $V_{th}$. The unmanned aerial vehicle may be controlled to fly back to the initial position thereof at an unchanged speed, or initially at the linear velocity of the unmanned aerial vehicle corresponding to the time point at which the horizontal linear acceleration of the unmanned aerial vehicle is attenuated to the first acceleration threshold and then at a gradually attenuated linear velocity which is calculated by attenuating the initial linear velocity by the first attenuation factor. Meanwhile, the angular velocity $\omega$ of the unmanned aerial vehicle is acquired in real time, and the acquired angular velocity is attenuated by a preset third attenuation factor $a_3$ when the angular velocity $\omega$ is greater than the second angular velocity threshold $\omega_{th}$, the attenuated angular velocity can be $(\omega-a_3*t)$, and then, the unmanned aerial vehicle flies rotationally at the speed of $(\omega-a_3*t)$ until the angular velocity thereof is below the second angular velocity threshold. In implementations, the third attenuation factor is determined according to the linear velocity of the unmanned aerial vehicle corresponding to the time point at which the horizontal linear acceleration of the unmanned aerial vehicle is attenuated to the first acceleration threshold, the first attenuation factor, the angular velocity of the unmanned aerial vehicle corresponding to the time point at which the angular velocity of the unmanned aerial vehicle increases to the peak and the linear velocity of the unmanned aerial vehicle back to the initial position thereof. In implementations, the first attenuation factor is below the initial linear velocity of the unmanned aerial vehicle corresponding to the time point at which the external force is released, and the second attenuation factor is below the initial linear acceleration of the unmanned aerial vehicle corresponding to the time point at which the external force is released. No limitations are given here to the setting of the attenuation factors of the linear velocity and the angular velocity of the unmanned aerial vehicle in a flying state.

In implementations, the flight modes of the unmanned aerial vehicle may be set to control the flight actions the unmanned aerial vehicle performs under the effect of a user-applied external force. For example, in a case where the flight modes of the unmanned aerial vehicle is set to be the boomerang mode, if the user applies a relatively large external force to the unmanned aerial vehicle, then the unmanned aerial vehicle flies at a gradually reduced speed under the effect of the user-applied external force until the speed thereof is attenuated to the first linear velocity threshold, and then the unmanned aerial vehicle flies back to the initial position thereof at a gradually increased linear velocity or at an unchanged speed. In a case where the flight modes of the unmanned aerial vehicle is set to be a drift mode, if the user applies a relatively large external force to the unmanned aerial vehicle, then the unmanned aerial vehicle flies at a gradually reduced speed under the effect of the user-applied external force until the speed thereof is attenuated to the first linear velocity threshold, and then the unmanned aerial vehicle hovers at the current position. That is, when the unmanned aerial vehicle flies under the effect of a user-applied external force, the linear velocity and the angular velocity of the flying unmanned aerial vehicle can be controlled in real time according to the set flight mode so that the unmanned aerial vehicle performs a flight action corresponding to the external force.

During an unmanned aerial vehicle control process, the unmanned aerial vehicle moves under a user-applied external force, the motion status information, for example, the linear acceleration, the linear velocity, and the angular velocity, of the unmanned aerial vehicle is acquired in real time, and an unmanned aerial vehicle control instruction is generated according to the motion status information acquired.

The preset period, the preset velocity threshold, the acceleration threshold and the time threshold mentioned herein can be experientially set in a control program in advance or set by the user on the operation interface of the unmanned aerial vehicle as needed before the user controls the unmanned aerial vehicle to perform a corresponding flight action, and no limitations are given to the setting of the thresholds and periods mentioned herein.

By obtaining (or acquiring), in real time, the motion status information of an unmanned aerial vehicle moving under the effect of a user-applied external force; generating at least one unmanned aerial vehicle control instruction based on the motion status information and controlling the unmanned aerial vehicle to perform a corresponding flight action according to the at least one unmanned aerial vehicle control instruction, the unmanned aerial vehicle control method disclosed herein addresses the problem that existing unmanned aerial vehicle control methods which at least request the user of an unmanned aerial vehicle to master a high-standard control technology are not applicable to ordinary users. After an unmanned aerial vehicle moves under the effect of a user-applied external force, the control method disclosed herein further controls the unmanned aerial vehicle to perform a corresponding flight action according to the current motion tendency of the unmanned aerial vehicle, thus freeing the user from mastering a complicated unmanned aerial vehicle control technology, reducing the difficulty of the control over the unmanned aerial vehicle and making the unmanned aerial vehicle more applicable. Moreover, the method and the apparatus disclosed herein enable more than one user to control the same unmanned aerial vehicle, thus improving the operability and the controllability of the unmanned aerial vehicle.

Embodiment 3

Figure 3:
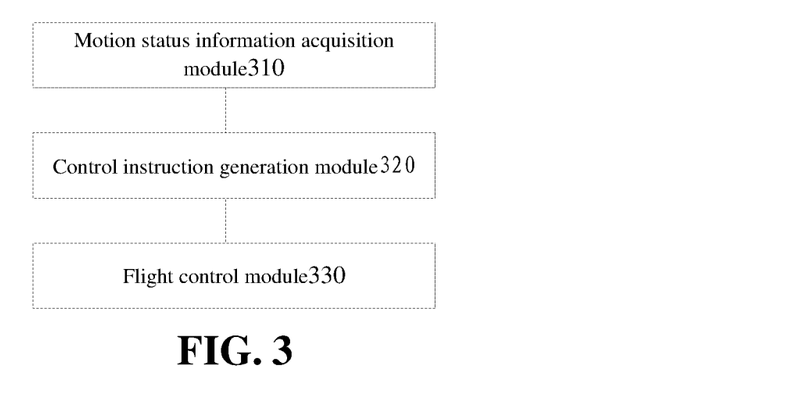
FIG. 3 is a schematic diagram 1 illustrating the structure of an unmanned aerial vehicle control apparatus according to embodiment 3 of the present disclosure.

As shown in FIG. 3, an unmanned aerial vehicle control apparatus is provided which includes:

a motion status information acquisition module 310 configured to acquire, in real time, the motion status information of an unmanned aerial vehicle moving under the effect of a user-applied external force;

a control instruction generation module 320 configured to generate at least one unmanned aerial vehicle control instruction based on the motion status information acquired by the motion status information acquisition module 310; and a flight control module 330 configured to control the unmanned aerial vehicle to perform a corresponding flight action according to the at least one unmanned aerial vehicle control instruction generated by the control instruction generation module 320.

Figure 4:
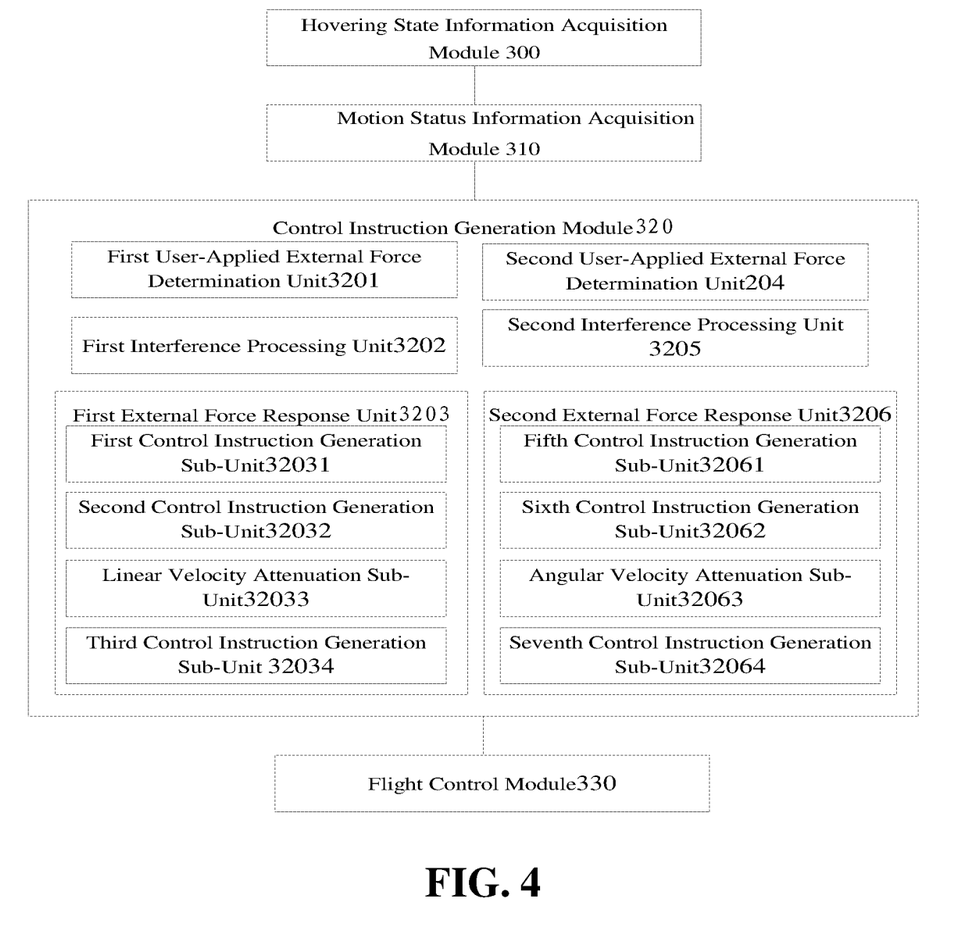
FIG. 4 is a schematic diagram 2 illustrating the structure of an unmanned aerial vehicle control apparatus according to embodiment 3 of the present disclosure.

Optionally, as shown in FIG. 4, the unmanned aerial vehicle control apparatus further includes:

a hovering state information acquisition module 300 configured to acquire the hovering status information of the unmanned aerial vehicle, wherein the hovering status information includes: the initial position of the unmanned aerial vehicle and the initial direction of the head of the unmanned aerial vehicle, wherein the initial position of the unmanned aerial vehicle includes the initial horizontal position and the initial height of the unmanned aerial vehicle. A unique initial horizontal position can be determined using the initial horizontal position and the initial height of the unmanned aerial vehicle, and the initial direction of the head of the unmanned aerial vehicle is the direction of the head of the unmanned aerial vehicle in a hovering state. In implementations, the initial position of the unmanned aerial vehicle can be represented with coordinates of a GPS.

Optionally, the motion status information includes: the linear acceleration and the linear velocity of the unmanned aerial vehicle, and as shown in FIG. 4, the control instruction generation module 320 includes:

a first user-applied external force determination unit 3201 configured to determine, according to the change tendency of the linear acceleration of the unmanned aerial vehicle acquired in real time, whether or not the user-applied external force under which the unmanned aerial vehicle starts moving is an interferential external force;

a first interference processing unit 3202 configured to generate a first instruction for controlling the unmanned aerial vehicle to fly back to the initial position thereof if the user-applied external force is an interferential external force; and a first external force response unit 3203 configured to generate an unmanned aerial vehicle control instruction according to the linear velocity of the unmanned aerial vehicle acquired in real time if the user-applied external force is not an interferential external force.

By setting the condition of the change tendency of the linear acceleration of the unmanned aerial vehicle, the interference of an external force and the interference or the error caused by the measurement of acceleration can be eliminated effectively.

Optionally, as shown in FIG. 4, the first external force response unit 3203 includes:

a first control instruction generation sub-unit 32031 configured to generate a second instruction for controlling the unmanned aerial vehicle to fly at the linear velocity acquired in real time if the linear velocity acquired in real time is greater than a preset linear velocity threshold; and a second control instruction generation sub-unit 32032 configured to generate a third instruction for controlling the unmanned aerial vehicle to stop flying in the direction of the current linear velocity if the linear velocity acquired in real time is smaller than or equal to the preset linear velocity threshold.

Optionally, during the process the unmanned aerial vehicle flies according to the instruction generated by the second control instruction generation sub-unit 32032, the first external force response unit 3203 further includes:

a linear velocity attenuation sub-unit 32033 configured to attenuate, by a first attenuation factor, the linear velocity of the unmanned aerial vehicle acquired by the motion status information acquisition module 310 in real time each preset period; and a third control instruction generation sub-unit 32034 configured to generate a second instruction for controlling the unmanned aerial vehicle to fly at the attenuated linear velocity.

Optionally, the motion status information of the unmanned aerial vehicle includes: the angular acceleration and the angular velocity of the unmanned aerial vehicle, and as shown in FIG. 4, the control instruction generation module 320 further includes:

a second user-applied external force determination unit 3204 configured to determine, according to the change tendency of the angular velocity or angular acceleration of the unmanned aerial vehicle acquired in real time, whether or not the user-applied external force under which the unmanned aerial vehicle starts moving is an interferential external force;

a second interference processing unit 3205 configured to generate a fourth instruction for controlling the orientation of the head of the unmanned aerial vehicle towards the initial direction of the head of the unmanned aerial vehicle if the user-applied external force under which the unmanned aerial vehicle starts moving is an interferential external force; and a second external force response unit 3206 configured to generate an unmanned aerial vehicle control instruction according to the angular velocity acquired in real time if the user-applied external force under which the unmanned aerial vehicle starts moving is not an interferential external force.

By setting the condition of the change tendency of the linear velocity and the angular velocity of the unmanned aerial vehicle, the interference of an external force and the interference or the error caused by the measurement of acceleration can be eliminated effectively.

Optionally, as shown in FIG. 4, the second external force response unit 3206 includes:

a fifth control instruction generation sub-unit 32061 configured to generate a fifth instruction for controlling the orientation of the head of the unmanned aerial vehicle towards the current direction if the angular velocity acquired in real time is smaller than or equal to a preset angular velocity threshold; and a sixth control instruction generation sub-unit 32062 configured to generate a sixth instruction for controlling the unmanned aerial vehicle to rotate at the angular velocity acquired in real time if the angular velocity acquired in real time is greater than the preset angular velocity threshold.

Optionally, during the process the unmanned aerial vehicle rotates according to the sixth instruction for controlling the unmanned aerial vehicle to rotate at the angular velocity acquired in real time, the second external force response unit 3206 further includes:

an angular velocity attenuation sub-unit 32063 configured to attenuate, by a second attenuation factor, the angular velocity of the unmanned aerial vehicle acquired by the motion status information acquisition module 310 in real time each preset period; and a seventh control instruction generation sub-unit 32064 configured to generate a sixth instruction for controlling the unmanned aerial vehicle to fly at the attenuated angular velocity.

The embodiment of the present disclosure, the motion status information is described based on a linear motion and a rotation motion. The motion status information of the unmanned aerial vehicle performing a linear action includes: the linear acceleration, the linear velocity and the real-time position of the unmanned aerial vehicle; and the motion status information of the unmanned aerial vehicle performing a rotation action includes: the angular velocity and the angular acceleration of the unmanned aerial vehicle and the current direction of the head of the unmanned aerial vehicle. When the unmanned aerial vehicle performs a linear action and a rotation action synchronously, the motion status information of the unmanned aerial vehicle includes: the linear acceleration, the linear velocity, the angular velocity, the angular acceleration and the real-time position of the unmanned aerial vehicle and the current direction of the head of the unmanned aerial vehicle. In implementations, related linear motion information can be processed by the first user-applied external force determination unit 3201, the first interference processing unit 3202 and the first external force response unit 3203 to generate a linear motion control instruction, and related rotation motion information can be processed by the second user-applied external force determination unit 3204, the second interference processing unit 3205 and the second external force response unit 3206 to generate a rotation motion control instruction.

Figure 5:
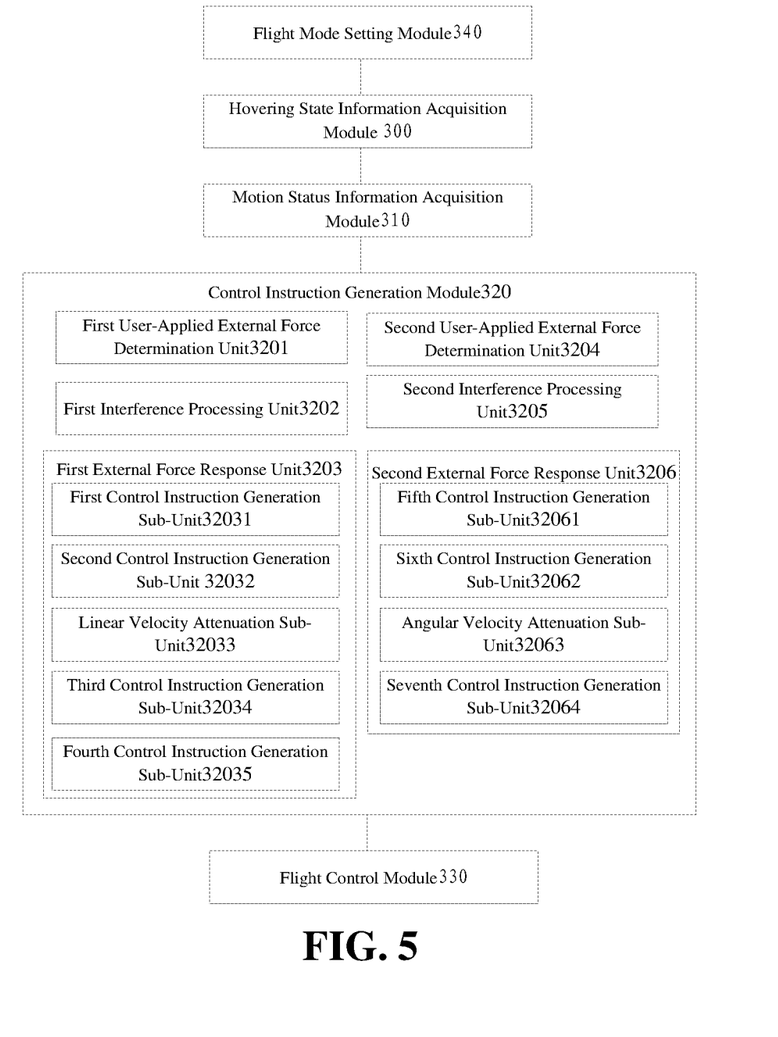
FIG. 5 is a schematic diagram 3 illustrating the structure of an unmanned aerial vehicle control apparatus according to embodiment 3 of the present disclosure.

Optionally, as shown in FIG. 5, the unmanned aerial vehicle control apparatus further includes:

a flight mode setting module 340 configured to set the flight mode of an unmanned aerial vehicle to be a boomerang mode, wherein the first external force response unit 3203 further includes:

a fourth control instruction generation sub-unit 32035 configured to generate a first instruction for controlling the unmanned aerial vehicle to fly back to the initial position thereof if the linear velocity of the unmanned aerial vehicle acquired in real time is smaller than or equal to a preset linear velocity threshold and the flight mode of the unmanned aerial vehicle is the boomerang mode. In implementations, the flight modes of an unmanned aerial vehicle can be set to control the flight actions the unmanned aerial vehicle performed under the effect of a user-applied external force. For example, in a case where the flight mode of an unmanned aerial vehicle is set to be the boomerang mode, if the user applies a relatively large external force to the unmanned aerial vehicle, then the unmanned aerial vehicle flies at a gradually reduced speed under the effect of the user-applied external force until the speed thereof is attenuated to a first linear velocity threshold and then flies back to the initial position thereof at a gradually increased linear velocity or at a fixed speed. In a case where the flight mode of an unmanned aerial vehicle is set to be a drift mode, if the user applies a relatively large external force to the unmanned aerial vehicle, then the unmanned aerial vehicle flies at a gradually reduced speed under the effect of the user-applied external force until the speed thereof is attenuated to the first linear velocity threshold and then stops flying in the direction of the current velocity. That is, when the unmanned aerial vehicle flies under the effect of a user-applied external force, the linear velocity and the angular velocity of the flying unmanned aerial vehicle can be controlled in real time according to the set flight mode of the unmanned aerial vehicle so that the unmanned aerial vehicle performs a flight action corresponding to the external force.

By obtaining (or acquiring), in real time, the motion status information of an unmanned aerial vehicle moving under the effect of a user-applied external force, generating at least one unmanned aerial vehicle control instruction based on the motion status information and controlling the unmanned aerial vehicle to perform a corresponding flight action according to the at least one unmanned aerial vehicle control instruction, the unmanned aerial vehicle control apparatus disclosed herein addresses the problem that existing unmanned aerial vehicle control methods which at least request the user of an unmanned aerial vehicle to master a high-standard control technology are not applicable to ordinary users. After an unmanned aerial vehicle moves under the effect of a user-applied external force, the control method disclosed herein further controls the unmanned aerial vehicle to perform a corresponding flight action according to the current motion tendency of the unmanned aerial vehicle, thus freeing the user from mastering a complicated unmanned aerial vehicle control technology, reducing the difficulty of the control over the unmanned aerial vehicle and making the unmanned aerial vehicle more applicable. Moreover, the apparatus disclosed herein enable more than one user to control the same unmanned aerial vehicle, thus improving the operability and the controllability of the unmanned aerial vehicle.

Embodiments of the apparatus disclosed herein are corresponding to the method disclosed herein, thus, the implementation forms of the modules in the embodiments of the apparatus can be understood with reference to embodiments of the method disclosed herein and are therefore not described here repeatedly.

Correspondingly, an unmanned aerial vehicle is disclosed which is provided with at least one acceleration measurer such as an acceleration sensor or a gyroscope; at least one velocity measurer such as a GPS module; a flight control module, a central processing unit and a memory, wherein the memory is configured to store programs for executing the unmanned aerial vehicle control methods described in embodiments 1 and 2, the central processing unit which comprises each module and each unit described in embodiment 3 executes the programs stored in the memory to execute the steps of the unmanned aerial vehicle control methods described in embodiments 1 and 2.

It should be appreciated by those of ordinary skill in the art that the units, the algorithms and the steps involved in the embodiments of the present disclosure can be realized by hardware, software or the combination thereof. Whether to realize these functions by hardware or software depends upon the application of a technical solution and restrictions in design. The realization of the same functions by those skilled in the art using other methods should fall within the scope of protection of the present disclosure.

It should be appreciated by those of ordinary skill in the art that the separate members involved in the embodiments of the present disclosure may be physically separated or not, or located at the same place or distributed in a plurality of network units. Moreover, the functional units involved in the embodiments of the present disclosure may be integrated in a processing unit or exist physically separately, or two or more of these functions are integrated in one unit.

These functions, when implemented as software units and sold or used as independent products, can be stored in a computer-readable storage medium. Based on the appreciation, the technical solutions of the present disclosure can be implemented as software products which can be stored in a storage medium and which comprise a plurality of instructions to execute a part of or all the steps of the methods described herein on one computer device (e.g. personal computer, server, or network device). The storage medium may be a U disk, a mobile hard disk drive, an ROM, an RAM, a diskette, a compact disc or another medium capable of storing program codes.

While certain embodiments have been described, these embodiments are not intended to limit the scope of the present disclosure. Indeed, any transformation or substitution that can be devised by those of ordinary skill in related arts without departing from the spirit of the disclosures and without making creative efforts should fall within the scope of protection of the present disclosure which is defined by the appended claims.

The invention claimed is:

1. An unmanned aerial vehicle control method, comprising:
    acquiring, a hovering state information of an unmanned aerial vehicle, wherein the hovering state information comprises a initial position of the unmanned aerial vehicle and a initial direction of the head of the unmanned aerial vehicle;
    obtaining, in real time, a motion status information of an unmanned aerial vehicle moving during a time period when a user-applied external force is applied and after the user-applied external force is cancelled, wherein the motion state information comprises at least one of the following: linear velocity, linear acceleration, angular velocity, angular acceleration;
    generating at least one unmanned aerial vehicle control instruction based on the motion status information, comprises: generating at least one unmanned aerial vehicle control instruction based on the change trend of the motion state information, wherein the change trend of the motion state information characterizes: at least one of the linear velocity, linear acceleration, angular velocity, and angular acceleration of the unmanned aerial vehicle gradually increases with the user-applied external force, and reaches a peak when the user-applied external force is cancelled, and starts to attenuate after the user-applied external force is cancelled; and
    controlling the unmanned aerial vehicle to perform a corresponding flight action according to the at least one unmanned aerial vehicle control instruction;
    wherein the step of
    generating at least one unmanned aerial vehicle control instruction based on the change trend of the motion state information, comprises:
    generating the unmanned aerial vehicle control instruction for controlling the unmanned aerial vehicle to fly back to the initial position or controlling the head of the unmanned aerial vehicle to be locked in the initial direction of the head of the unmanned aerial vehicle, when the value represented by the motion state information of the unmanned aerial vehicle gradually increases from the value when the user-applied external force begins to be applied to the peak value, and when the difference in time, between when the user-applied external force begins to be applied and the time of peak value, is less than a set time threshold; and/or
    generating the unmanned aerial vehicle control instruction for controlling the unmanned aerial vehicle to fly according to the size and direction represented by the current motion state information, when the value represented by the current motion state information is greater than a set threshold; generating the unmanned aerial vehicle control instruction for controlling the unmanned aerial vehicle to stop flying in the direction represented by the current motion state information, when the value represented by the current motion state information is less than or equal to the set threshold, when the value represented by the motion state information of the unmanned aerial vehicle gradually increases from the value when the user-applied external force begins to be applied to the peak value, and when the difference in time, between when the user-applied external force begins to be applied and the time of peak value, is greater than or equal to the set time threshold.

2. The method according to claim 1, wherein the step of generating at least one unmanned aerial vehicle control instruction based on the motion status information comprises:
    determining, according to a change tendency of the linear acceleration of the unmanned aerial vehicle acquired in real time, whether or not the user-applied external force under which the unmanned aerial vehicle starts moving is an interferential external force;
    generating a first instruction for controlling the unmanned aerial vehicle to fly back to the initial position thereof if the user-applied external force is the interferential external force; or
    generating an unmanned aerial vehicle control instruction according to the linear velocity acquired in real time if the user-applied external force is not the interferential external force.

3. The method according to claim 2, wherein the step of generating an unmanned aerial vehicle control instruction according to the linear velocity acquired in real time comprises:
    generating a second instruction for controlling the unmanned aerial vehicle to fly at the linear velocity acquired in real time if the linear velocity acquired in real time is greater than a preset linear velocity threshold; or
    generating a third instruction for controlling the unmanned aerial vehicle to stop flying in the direction of a current linear velocity if the linear velocity acquired in real time is smaller than or equal to the preset linear velocity threshold.

4. The method according to claim 1, wherein during the process the unmanned aerial vehicle flies according to the second instruction acquired in real time, the method further comprises:
    attenuating, by a first attenuation factor each preset period, the linear velocity of the unmanned aerial vehicle acquired in real time; and
    generating the second instruction for controlling the unmanned aerial vehicle to fly at the attenuated linear velocity.

5. The method according to claim 1, further comprising: a step of obtaining, in real time, a motion status information of an unmanned aerial vehicle moving during a time period when a user-applied external force is applied and after the user-applied external force is cancelled prior to the step of:
    obtaining, in real time, the motion status information of an unmanned aerial vehicle moving under the effect of a user-applied external force, wherein
    the step of generating an unmanned aerial vehicle control instruction according to the linear velocity acquired in real time further comprises:
    generating a first instruction for controlling the unmanned aerial vehicle to fly back to the initial position thereof if the linear velocity acquired in real time is smaller than or equal to the preset linear velocity threshold and the flight mode of the unmanned aerial vehicle is the boomerang mode.

6. The method according to claim 1, wherein if the motion status information comprises a angular velocity and a angular acceleration of the unmanned aerial vehicle, then the step of generating at least one unmanned aerial vehicle control instruction based on the motion status information comprises:

determining, according to a change tendency of the angular velocity or the angular acceleration acquired in real time, whether or not the user-applied external force under which the unmanned aerial vehicle starts moving is an interferential external force;

generating a fourth instruction for controlling a orientation of the head of the unmanned aerial vehicle towards a initial direction of the head of the unmanned aerial vehicle if the user-applied external force is an interferential external force; or generating an unmanned aerial vehicle control instruction according to the angular velocity acquired in real time if the user-applied external force is not an interferential external force.

7. The method according to claim 6, wherein the step of generating an unmanned aerial vehicle control instruction according to the angular velocity acquired in real time comprises:

generating a fifth instruction for controlling the orientation of the head of the unmanned aerial vehicle towards a current direction if the angular velocity acquired in real time is smaller than or equal to a preset angular velocity threshold; or generating a sixth instruction for controlling the unmanned aerial vehicle to rotate at the angular velocity acquired in real time if the angular velocity acquired in real time is greater than the preset angular velocity threshold.

8. The method according to claim 1, wherein during the process the unmanned aerial vehicle rotates according to the sixth instruction for controlling the unmanned aerial vehicle to rotate at the angular velocity acquired in real time, the method further comprises:

attenuating, by a second attenuation factor each preset period, the angular velocity of the unmanned aerial vehicle acquired in real time; and generating the sixth instruction for controlling the unmanned aerial vehicle to rotate at the attenuated angular velocity.

\* \* \* \* \*